(12) United States Patent
Liebl et al.

(10) Patent No.: US 9,839,977 B2
(45) Date of Patent: Dec. 12, 2017

(54) APPARATUS FOR LASER MATERIALS PROCESSING

(71) Applicant: MTU Aero Engines AG, Munich (DE)

(72) Inventors: Christian Liebl, Bockhorn (DE); Steffen Schlothauer, Erdweg (DE)

(73) Assignee: MTU Aero Engines AG, Munich (DE)

( * ) Notice: Subject to any disclaimer, the term of this patent is extended or adjusted under 35 U.S.C. 154(b) by 399 days.

(21) Appl. No.: 14/474,957

(22) Filed: Sep. 2, 2014

(65) Prior Publication Data

US 2015/0060422 A1    Mar. 5, 2015

(30) Foreign Application Priority Data

Sep. 4, 2013 (DE) .................. DE 10 2013 217 598

(51) Int. Cl.
| | |
|---|---|
| B23K 26/08 | (2014.01) |
| B23K 26/10 | (2006.01) |
| B33Y 30/00 | (2015.01) |
| B23K 26/14 | (2014.01) |
| B23K 26/16 | (2006.01) |
| B23K 26/342 | (2014.01) |
| B23K 26/144 | (2014.01) |
| B23K 26/60 | (2014.01) |
| C21D 1/42 | (2006.01) |
| B22F 3/105 | (2006.01) |
| C21D 11/00 | (2006.01) |

(52) U.S. Cl.
CPC .......... *B23K 26/08* (2013.01); *B23K 26/0869* (2013.01); *B23K 26/0876* (2013.01); *B23K 26/10* (2013.01); *B23K 26/144* (2015.10); *B23K 26/1464* (2013.01); *B23K 26/16* (2013.01); *B23K 26/342* (2015.10); *B23K 26/60* (2015.10); *B33Y 30/00* (2014.12); *C21D 1/42* (2013.01); *B22F 2003/1056* (2013.01); *C21D 11/00* (2013.01); *C21D 2251/04* (2013.01); *Y02P 10/253* (2015.11); *Y02P 10/295* (2015.11)

(58) Field of Classification Search
CPC .......................... B23K 26/08; B23K 26/0869; B23K 26/0876; B23K 26/10; B33Y 30/00
See application file for complete search history.

(56) References Cited

U.S. PATENT DOCUMENTS

| | | | |
|---|---|---|---|
| 2003/0052105 A1* | 3/2003 | Nagano | B23K 26/0604 219/121.83 |
| 2006/0081571 A1 | 4/2006 | Hoebel et al. | |

(Continued)

FOREIGN PATENT DOCUMENTS

| | | |
|---|---|---|
| DE | 199 53 000 | 5/2001 |
| DE | 10 2010 018 686 | 10/2011 |

(Continued)

*Primary Examiner* — Ryan Reis

(74) *Attorney, Agent, or Firm* — Davidson, Davidson & Kappel, LLC

(57) ABSTRACT

An apparatus for laser materials processing including a laser (4) for generating a laser beam and a laser head (5) which is movable along at least one spatial direction and is connected to the laser via a light guide, and which emits a laser beam (7) capable of processing a material. The present invention also relates to an apparatus for selective laser melting or selective laser sintering having an apparatus for laser materials processing.

9 Claims, 2 Drawing Sheets

(56) References Cited

U.S. PATENT DOCUMENTS

| | | | |
|---|---|---|---|
| 2010/0233012 A1* | 9/2010 | Higashi | B22F 3/1055 419/9 |
| 2011/0259858 A1* | 10/2011 | Wappler | B23K 26/032 219/121.64 |
| 2013/0233846 A1* | 9/2013 | Jakimov | B22F 3/1055 219/601 |
| 2014/0169981 A1* | 6/2014 | Bales | B22F 5/04 416/96 R |
| 2014/0186549 A1* | 7/2014 | Miyagi | B05B 1/24 427/554 |

FOREIGN PATENT DOCUMENTS

| | | |
|---|---|---|
| DE | 10 2010 050 531 A1 | 3/2012 |
| EP | 1 396 556 | 3/2004 |
| EP | 2 246 145 | 11/2010 |
| JP | 2001301045 | 10/2001 |
| JP | 2013 075 308 | 4/2013 |

* cited by examiner

APPARATUS FOR LASER MATERIALS PROCESSING

This claims the benefit of German Patent Application DE 10 2013 217 598.1, filed Sep. 4, 2014 and hereby incorporated by reference herein.

The present invention relates to an apparatus for laser materials processing, and to an apparatus for selective laser melting or laser sintering.

BACKGROUND

Additive manufacturing methods for producing a component, such as, for example, selective laser melting, selective laser sintering or laser deposition welding, are used in industry for what is known as rapid tooling, rapid prototyping and also for rapid manufacturing of repetition components. In particular, such methods may also be used for manufacturing turbine components, particularly components for aircraft engines, where such additive manufacturing methods are advantageous, for example, because of the material used. An example of this is found in DE 10 2010 050 531 A1.

In addition, lasers are also used in many other materials processing applications for melting or just heating materials. In all of these methods, the heat input can result in the generation of fumes; i.e., the generation of combustion gases, evaporation of material, and the like, which may prevent continued efficient coupling of laser light into the material to be processed. For this reason, it is already known to provide a laminar gas flow in the region of the laser processing field to allow the generated fumes to be carried away by the gas flow.

SUMMARY OF THE INVENTION

Moreover, when deflection mirrors are used for scanning or sweeping the laser beam over the processing field, the beam shape may unintentionally be distorted. Depending on the accuracy and spatial resolution desired for the processing of materials, such distortions may lead to undesired effects.

Another problem in laser materials processing is that the rapid heating and melting, and the cooling of the heated or melted regions, can cause internal stresses and formation of cracks.

It is an object of the present invention to provide an apparatus capable of overcoming, or at least reducing, the problems of the prior art and, in particular, of providing an undistorted laser beam for scanning a region to be processed. In addition, the apparatus is intended to allow melted or remelted regions to solidify without cracking and with minimum stress formation, and to efficiently use the energy of the laser beam.

The present invention provides a laser head which is movable along at least one spatial direction and can be moved over a material to be processed, and which is connected via a light guide to the laser beam generating unit of the laser. Instead of directing the laser beam via deflection mirrors over a surface to be processed, the laser head is passed over the surface to be processed. The laser head emits the laser beam directly from a light guide, so that the shape of the laser beam can be prevented from being distorted.

The laser head may in particular be adapted to be translationally movable along at least two independent spatial directions, so that the laser head may be movable, for example, within or along a plane. This allows the movable laser head to reach any point of a surface to be processed, in particular during selective laser melting or laser sintering.

In addition, a movable laser head offers the advantage that additional devices may be provided on the laser head, such as, for example, a suction device for fumes and the like and/or a temperature conditioning device for pre- and post-heating, or also for cooling, of the region being processed.

The suction device may be adapted to create a suction flow parallel to the direction of the laser beam, and particularly a suction flow that is offset from the laser beam, so that unwanted components (e.g., fumes) in the atmosphere above the material to be processed can be removed without further affecting the laser beam.

A temperature conditioning device may include suitable heating and/or cooling devices, in particular induction coils, Peltier elements, and the like. The temperature conditioning device allows for local pre- and post-treatment with respect to a temperature treatment prior and/or subsequent to the region being processed with the laser beam, thus making it possible to prevent or reduce stresses and cracks in the material processed.

The apparatus for laser materials processing may be used in particular in an apparatus for selective laser melting or selective laser sintering.

BRIEF DESCRIPTION OF THE DRAWINGS

The enclosed drawings show purely schematically in

FIG. 1: a schematic view of an apparatus for selective laser melting; and in

DETAILED DESCRIPTION

Other advantages, characteristics and features of the present invention will become apparent from the following detailed description of an exemplary embodiment. However, the present invention is not limited to this exemplary embodiment.

Figure 1:
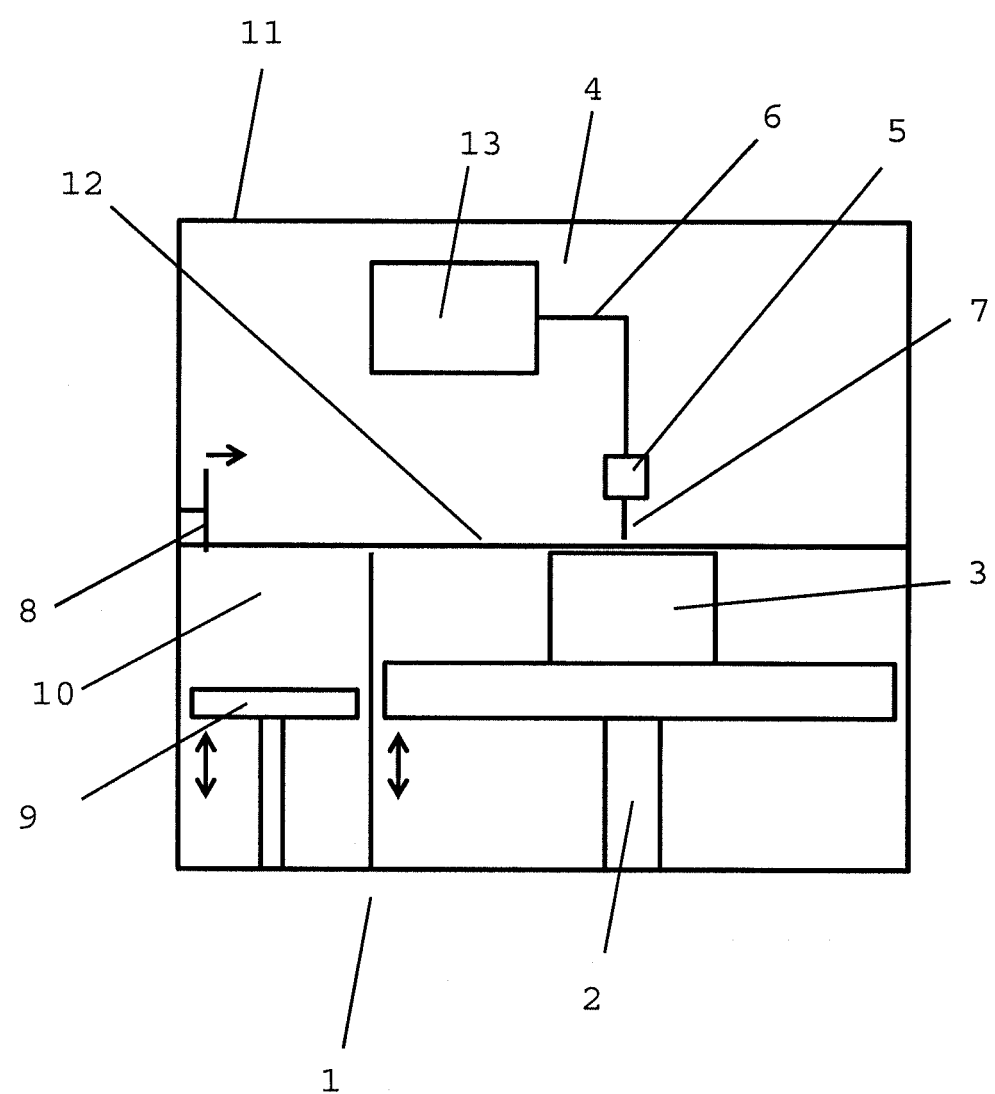

FIG. 1 shows, purely schematically, an apparatus 1, such as may be used for selective laser melting for additively manufacturing a component. Apparatus 1 includes a lifting table 2, on the platform of which is positioned a semi-finished product 3 on which material is deposited in layers to produce a three-dimensional component. To this end, powder 10 located in a powder reservoir above a lifting table 9 is pushed by a wiper 8 onto semi-finished product 3 layer by layer and subsequently bonded to the existing semi-finished product 3 by melting or sintering by means of the laser beam 7 of a laser 4. Laser beam 7 bonds the powder material in a powder layer to semi-finished product 3 according to the desired contour of the component to be produced, which makes it possible to produce any desired three-dimensional shape. In order to prevent unwanted reactions with the surrounding atmosphere during melting or sintering, the process takes place in a sealed chamber provided by a housing 11 of apparatus 1 and, in addition, an inert gas atmosphere is provided, for example, to prevent oxidation of the powder material during deposition or the like. The inert gas used may, for example, be nitrogen which is provided via a gas supply.

In accordance with the present invention, laser 4 has a laser head 5 which is movable two-dimensionally along a plane parallel to the processing plane 12 of the build chamber. Laser head 5 is connected by a cable 6 to stationary laser beam generating unit 13. Cable 6 contains a light guide for conveying the laser beam from laser beam generating unit 13 to laser head 5, as well as supply and control lines for delivering energy to laser head 5 and controlling the movement as desired.

Figure 2:
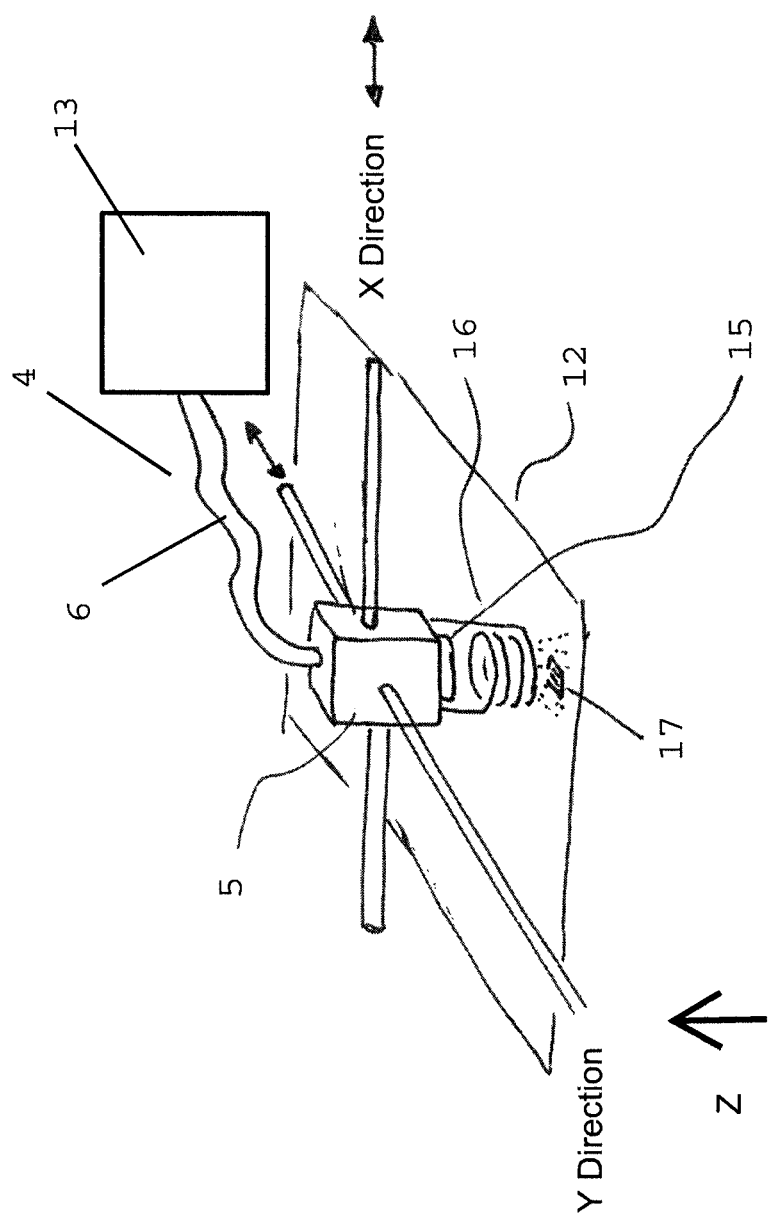
FIG. 2: a perspective view of a detail of the embodiment of FIG. 1.

FIG. 2 is a in perspective view of the laser head 5 of the apparatus 1 of FIG. 1, again showing stationary laser beam generating unit 13 and flexible cable 6 for laser head 5. As shown in the view of FIG. 2, laser head 5 is movable along spatial directions X and Y above processing plane 12. The laser beam (not specifically shown in FIG. 2) creates an irradiation or melting region 17 in processing plane 12, in which the powder material is locally selectively melted to build up a three-dimensional object. The direction in which the component is built up layer by layer is indicated by the Z arrow.

Laser head 5 includes an induction coil 16 which is provided as a heating device for pre- and/or post-heating the region around melting region 17.

In addition to the induction coil 16 for inductive heating, laser head 5 further includes a suction device 15 capable of drawing gas from the region between processing plane 12 and laser head 5. The heat input by the laser beam can cause the formation of fumes at melting region 17. Such fumes can potentially prevent the unhindered introduction of the laser beam power into the powder in processing plane 12. Suction device 15 allows the fumes to be drawn in directly from melting region 17, making it possible to prevent or reduce attenuation of the laser beam by the fumes. By annular suction around the laser beam, it is possible to largely prevent the laser beam from being affected by the fumes drawn off.

Pre-heating and/or post-heating of the melted material by means of the induction coil can prevent the processed material from cracking due to excessively rapid melting and cooling.

Since laser head 5 can be moved to any point above processing plane 12 by translational movements along the X direction and the Y direction, so that the laser beam can accordingly melt the powder material directly underneath, it is possible to build up, layer by layer, a component of any desired shape. Since laser head 5 receives the laser beam from a light guide and emits it directly above melting region 17, the shape of the beam is not altered (e.g., ellipsoidally distorted) by deflection mirrors.

Although the present invention has been described in detail with reference to the exemplary embodiments thereof, those skilled in the art will understand that it is not intended to be limited thereto and that modifications may be made by omitting individual features or by combining features in different ways, without departing from the protective scope of the appended claims. The present disclosure encompasses any combination of any of the individual features presented herein.

What is claimed is:

1. An apparatus for laser materials processing comprising:
    a stationary laser for generating a laser beam;
    a movable laser head, the laser head translationally movable along at least two independent spatial directions and within or along a plane and connected to the stationary laser via cable, the cable containing a light guide, the laser head emitting a laser beam capable of processing a material; the laser head including a suction device creating a suction flow parallel to a direction of the laser beam; and
    a temperature conditioning device including an induction coil.

2. The apparatus as recited in claim 1 wherein the laser is a fiber laser.

3. The apparatus as recited in claim 1 wherein the suction device creates a suction flow offset from the laser beam.

4. The apparatus as recited in claim 3 wherein the suction flow is concentric with the laser beam.

5. The apparatus as recited in claim 1 wherein the induction coil is disposed around the laser beam.

6. The apparatus as recited in claim 1 wherein the induction coil is disposed concentrically around the laser beam.

7. An apparatus for selective laser melting or selective laser sintering comprising the apparatus as recited in claim 1.

8. A method of producing a three dimensional product with the apparatus of claim 1, comprising:
    providing a platform on which a semi-finished product is positioned;
    placing powder onto the semifinished product;
    moving the movable laser head translationally along at least two independent spatial directions and within or along a plane to bond the powder to the semifinished product using the laser beam according to a desired contour of the three-dimensional product to be produced; and
    repeating the placing and moving steps to build up, layer by layer, the three-dimensional product to be produced.

9. A method of producing a three dimensional product with the apparatus of claim 1, comprising:
    moving the movable laser head translationally along at least two independent spatial directions and within or along a plane, such that the laser beam creates a melted region in a processing plane to build up, layer by layer, the three-dimensional product to be produced.

* * * * *